Patented Oct. 17, 1944

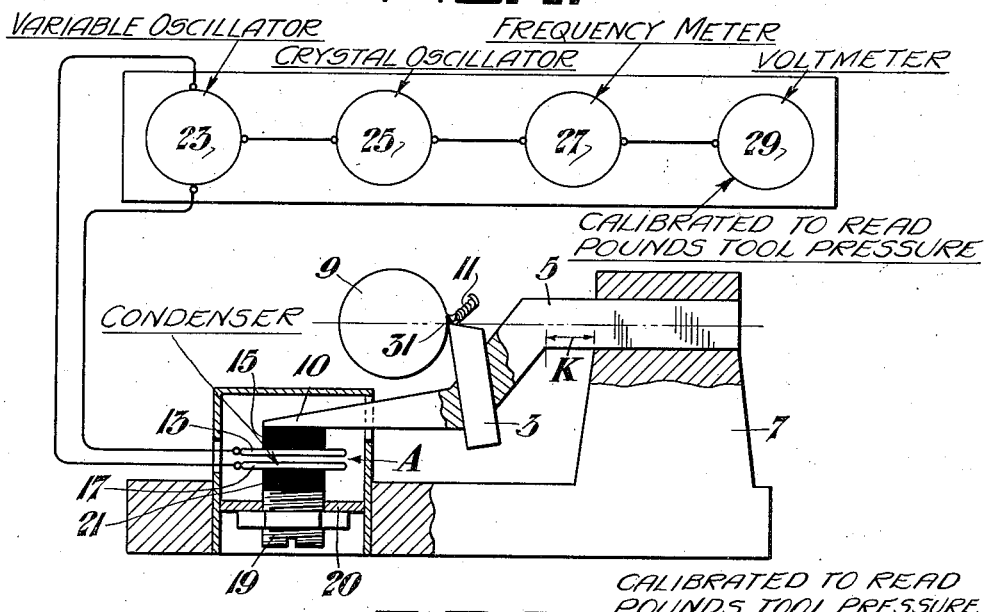
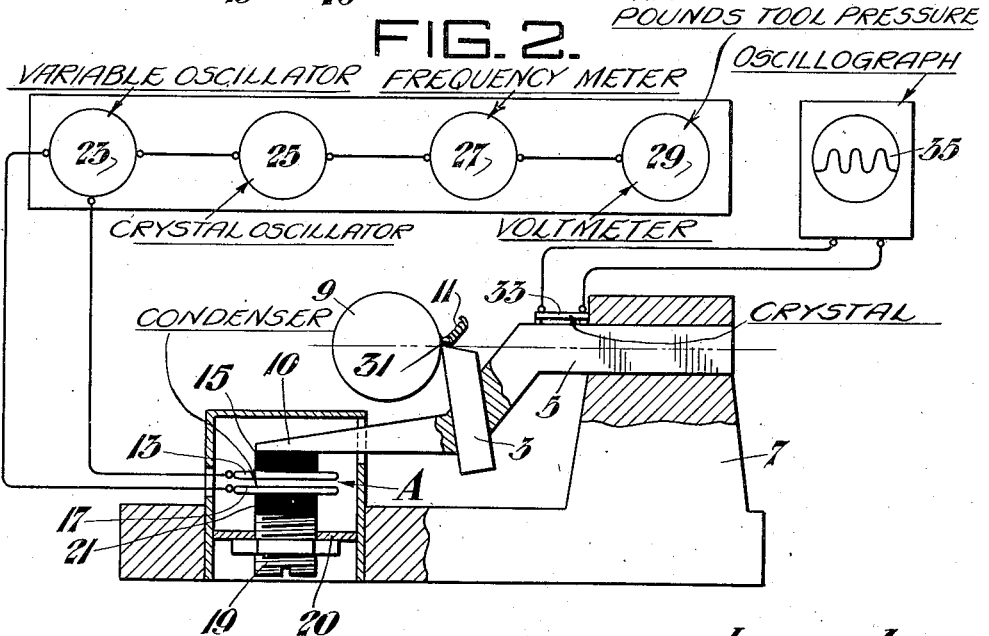

2,360,639

UNITED STATES PATENT OFFICE 2,360,639

METALWORKING APPARATUS

Morris Asimow, Los Angeles, Calif., and Walter F. Craig, Jr., and Paul Gravenstretter, Gary, Ind.; said Craig, Jr., and said Gravenstretter assignors to Carnegie-Illinois Steel Corporation, a corporation of New Jersey Application October 21, 1941, Serial No. 415,952

7 Claims. (Cl. 73—7)

In accordance with the present invention there are provided certain improvements in the testing and determination of certain metallographic properties of metals, such as, ferrous metals, or any metal which is to be examined for physical and metallographic properties.

Among such properties may be mentioned the property of machinability which is the property enabling a metal to be cut by a machining tool, which property is influenced importantly by the metallographic properties of the metal.

In a general way, machinability refers to the ease with which metals may be cut to produce a satisfactory product. A machinist scrutinizes several phases of the machining operation. For economic reasons, he must be sure that his tools will stand up satisfactorily when the cutting proceeds at a sufficiently rapid rate to insure good economy of production. He cannot exceed the strength or capacity of his equipment, and so he must know that the machining operation will not require an excessive amount of power.

The economics involved in machining operation are dependent to a large extent on power requirements which are determined by the pressure exerted on the tool and by the speed of operation. Excessive pressure on the tool tends to distort the work and makes it difficult to maintain close tolerances; it also increases the possibility of chatter. Finally, a machinist is interested in the quality of the surface which he obtains on his finished and semi-finished parts. Many parts are used as machined and the tool must leave a smooth and acceptable finish. Other parts may be ground in other finishing operations. The amount of grinding which may be necessary is influenced by the quality of the machined surface.

In order to cut successfully, a tool must accomplish two things. Thus, its shape must be such that its cutting edge, continuously impressing itself upon the work material, produces a crack which enables the chip to separate from the parent material. Further, the tool must act somewhat like an extrusion die, in that a chip which is held securely in the shoulder of the cut is pressed against the tool and must abruptly change its shape. High bearing pressures are developed which depend upon the hardness and toughness of the steel. It is the extruding action upon the cutting face of the tool which is responsible for the greater share of the power consumed in cutting, and under such severe conditions of bearing pressure, it is clear that the tool will suffer appreciably on the area which is in contact with the chip.

Other factors which affect machining include the increase of temperature which results from the machining operation, and also there are a host of other practices which can defeat the good performance of superior machining tools. These factors are associated with the quality of the tool steel and its heat treatment, with the shape of the tool and its handling during grinding, with the rigidity of the work and its supporting rests, with the rigidity of the tool and its holder, with the suitability of the cutting conditions, and with the selection and use of the cutting fluid. These factors, however, are under the control of the steel user.

In machining operations, the tool pressure is of importance, and various methods have been devised for the determination of such pressure, because this is one of the factors governing the power consumption which has been mentioned above.

In accordance with the present invention, there is provided an improved apparatus wherein there is utilized equipment which is well known in the field of electronics, where it is employed for measuring the frequency of an alternating potential, principally broadcast carrier frequencies. This equipment consists of a variable oscillator electrically coupled to a crystal controlled oscillator, together with a frequency deviation meter which indicates the difference in frequency or "beat frequency" of the two units. Standard commercial equipment of this type detects a shift in frequency of the variable oscillator of one or two cycles per second from a normal frequency of one million cycles per second or an accuracy of measurement in certain conditions of one or two parts per million.

In the present improved apparatus for measuring tool pressure, advantage is taken of the extreme sensitivity of this equipment to measure the minute deflection of the tool during cutting, this deflection being related to the cutting pressure.

The present invention has for one of its objects the provision of an apparatus for determining tool pressures during machining, which apparatus possesses substantially higher accuracy than the heretofore-devised equipment for this purpose and which involves a higher degree of sensitivity than has been obtainable heretofore, and which obviates the need for frequent recalibration of the equipment.

A further object of the invention is to provide an apparatus for carrying out the above advantages, and which will withstand the vibration and abuse attendant to its use on high speed production machines, enabling measurements to be made during commercial machining conditions.

In general, in carrying out the present invention, a tool is mounted in a holder which provides a rigid cantilever support. As pressure is applied to the tool the cantilever beam deflects by an amount nearly proportional to the applied pressure. At its extremity the tool holder carries one plate of a condenser, the other plate of the condenser being mounted on an adjustment screw. As pressure is applied to the tool, the two plates move closer together by a very slight amount, thus changing the capacitance of the condenser. This movement is very slight, for a pressure of 100 pounds on the tool reduces the air gap between the condenser plates by only 0.0001 of an inch. The condenser is an element in a radio frequency oscillator circuit which normally is adjusted so that the frequency of oscillation is one million cycles per second. As pressure is applied, the capacitance is increased and the frequency of oscillation is decreased. In order to measure the pressure, the decrease in the frequency of oscillation is measured.

The invention includes a convenient means for doing this. In radio broadcasting stations it is important that the station remain within the frequency period assigned to it. The station operator compares the frequency of his sending equipment with the frequency of a carefully ground quartz crystal, which by an electrical means, is forced to oscillate at its own resonant frequency. When the station frequency deviates from that of the so-called frequency monitor, a beat frequency results, which is the same thing that happens when two tuning forks of slightly different pitch are sounded. Together the rising and diminishing intensity of the sound is analogous to the beat frequency which results when the station frequency differs from the monitor frequency. The difference in frequency or beat frequency is measured by means of a frequency meter.

In the case of the tool pressure measuring device, the beat frequency becomes greater as the pressure is increased and in practically direct proportion. The whine of the beat frequency can be heard when the operator throws a switch which sends a signal to a loud speaker. The pitch increases as the operator applies added pressure to the tool. The measurement from the frequency meter is transferred to a meter which is calibrated to read directly in pounds of tool pressure. A calibration is checked accurately by applying dead weights through a suitable leverage to the tool itself. The adjusting screw on the lower condenser plate is turned until the meter reads correctly the pressure which is applied to the tool.

In addition to the average pressure which the chip exerts upon the tool, it sometimes becomes of great importance to note the instantaneous pressure on the tool. This is accomplished by cementing a suitable vibration-responsive crystal, such as a Rochelle salt crystal, such as is used in certain types of earphones and phonograph pickups, to the surface of the tool holder. As pressure is applied to the tool, the crystal is strained and the electrical charge on its surfaces changes in amount. The result is a varying voltage generated by the crystal corresponding with the varying amount of strain imposed upon the tool holder. This voltage, suitably amplified, is projected as an electronic beam on the phosphorescent screen of an oscillograph. The oscillograph follows extremely rapid variations, and as the electronic beam is swept horizontally across the screen, the varying voltage corresponding to the movement of the tool holder is traced on its screen. It will be observed that when the tool holder is tapped, even very slightly, it immediately begins to vibrate with a certain characteristic frequency; namely, its own natural frequency, and as time progresses these oscillations are rapidly damped out due mainly to internal friction in the material of the tool holder. It will be observed, moreover, that when a cut is in progress, the instantaneous variations in pressure correspond in frequency very closely to the unrestrained vibration of the tool when it is vibrated freely. This is found to be true regardless of the speed of cutting, or the size of the cut. It demonstrates clearly that the tool, due perhaps to irregularities in the cutting pressure, is induced to vibrate at its own natural frequency and perhaps much like a chipping tool in an air hammer striking the work piece with a continual shower of blows, the intensity of which depends upon the conditions of cutting and the work material, but the frequency of which depends only on the mass and rigidity of the tool and its mounting. These remarks are true, providing that the work piece itself is not induced to vibrate at its resonant frequency. When the latter occurs, the well known phenomenon of chattering appears.

The invention will be understood more readily from the accompanying drawing wherein, Fig. 1 represents, diagrammatically, one form of apparatus which is employed in the operation of the present invention, and Fig. 2 represents a modified form, which is adapted to be used for determining the instantaneous pressure on the tool.

Referring more particularly to the drawing, and first to Fig. 1, wherein it will be seen that a tool 3 is mounted in a holder 5 which is held in a tool post 7, the tool 3 being shown as operating upon a workpiece 9, and producing therefrom a chip 11.

As pressure is applied to the tool, the cantilever tool holder 5 deflects by an amount nearly proportional to the applied pressure. At its extremity, the tool holder 5 carries one plate 13 of an electrostatic condenser A, the mounting being made through insulation 15. The other plate 17 of the condenser A is mounted on an adjustment screw 19, threadedly mounted in a holder 20. As pressure is applied to the tool the plates 13 and 17 move closer together by a very slight amount, thus changing the capacitance of the condenser. It will be noted that condenser plate 17 is mounted on adjustment screw 19 through insulation 21.

The condenser A is one element of a radio frequency oscillator 23. As the capacitance of condenser A changes due to pressure applied to the tool 3, the frequency of the alternating potential generated by the oscillator 23 changes.

In order to measure the pressure, this change or shift in frequency of oscillation must be measured, which is accomplished by electrically coupling the variable oscillator 23 with a constant frequency oscillator 25. With no pressure on the tool, the variable oscillator 23 and the constant frequency oscillator 25 are adjusted to the same frequency. If pressure now is applied, it results in a shift in frequency of oscillator 23, and a beat frequency is generated which is equal to the difference in frequencies of the two oscillators and is nearly proportional to the applied pressure.

The beat frequency is measured by means of an electronic frequency meter 27, the output current of which is proportional to the input frequency. The direct current output of the electronic frequency meter 27 is measured by a suitable voltmeter 29, which is calibrated to read directly in pounds tool pressure.

The calibration of voltmeter 29 is effected by applying dead weights through a suitable leverage to the tool itself, and noting the frequency shift. The sensitivity of the apparatus may be adjusted by varying the normal spacing of the condenser plates by means of the adjustment screw 19.

The apparatus preferably is constructed so that the center line of the workpiece being machined, the tool point, and the center line of support of the tool holder in the tool post are all on a common center line.

Essentially, the mechanics involved in this apparatus are a lever which consists of that portion of the workpiece being machined that extends from the center of the workpiece to the tool point, and applies pressure to the tool point at the point of contact 31.

Likewise, the tool holder itself, and the tool point form a lever which extends from the point of the tool to the center line of support in the tool post, making a simple combination of two levers with a downward force at the point 31 and upward forces on the center line of the workpiece and at the point of support at the tool post.

This forms a very simple diagram of forces which can be measured with much greater ease and accuracy than if the three points mentioned were not in line with each other.

It will be understood, however, that it is possible to obtain the measurement of the tool pressure at any other points, although it will be understood readily that the diagram of forces will be much more complicated.

In the preferred form of the apparatus shown in Fig. 1, the combination of the two levers as described above, causes the tool holder 5 to bend along that portion thereof which is indicated on the drawing by K.

The pressure on the cutting edge of the tool may be resolved into three components:
 1. Axial (backward thrust)
 2. Longitudinal (feed pressure); and,
 3. Tangential, (downward thrust).

As it has been pointed out above herein, the tangential pressure is generally of the most interest.

In order to separate and measure this component, the following features are incorporated in the design of the tool holder:

1. The holder is so proportioned that bending under pressure is confined virtually to the length indicated by K on the drawing, the balance of the tool holder undergoing no local deformation but moving rigidly as a unit.

2. The tool is so mounted that the cutting edge in contact with the work lies on a projection of the axis or center line of the cantilever beam section of the holder. Thus, radial pressure imposes pure compression, and longitudinal pressure pure shear on the cantilever beam section.

In neither case, however, will bending occur which would alter the spacing of the condenser plates. Tangential pressure only sets up a bending moment, altering the spacing of the plates, and thus being reflected in the pressure reading.

In order to overcome temperature gradients within the holder from introducing errors due to the differential expansion and resultant warpage, it is preferred to make the holder from the well-known alloy called Invar metal, which metal has a substantially zero coefficient of thermal expansion.

It is thought that the construction and operation of the improved equipment will become apparent from the foregoing description.

The usual precautions which are well known to those skilled in the art of electronics are taken with respect to proper shielding of the high frequency electrical circuits.

The remaining details of the tool holder, tool post, and variable condenser are matters of mechanical convenience in assembling and using the apparatus, and are in no respect essential requirements; and, also, the oscillators and meters are standard pieces of electrical equipment in themselves, although used in a new way, as is described herein.

In general, the present invention has the advantage of accurately indicating the average tangential tool pressure continuously, as well as the instantaneous tangential tool pressure, while cutting under conditions comparable to commercial machining operations. Specifically this present apparatus overcomes objections present in previous devices in the following particulars:

1. In comparison to indirect methods which depend upon the measure of power input to the machine, the new apparatus has the advantage of increased accuracy and of indicating variations in pressure as they occur, rather than of indicating a rough average. In deducing pressure from power input, a correction must be made for friction in the machine which does not remain constant under different loads, thus introducing an error of unknown magnitude.

2. Mechanical devices for measuring a deflection of a spring or hydraulic tool mounting are less sensitive than electrical devices, they do not permit the necessary rigidity of mounting, and introduce mechanical lag in the response. The present improved apparatus permits a rigid tool mounting, duplicating commercial practice. Accurate measurements may be made with a maximum deflection of the tool limited to a few hundred thousandths of an inch.

3. In comparison to electric devices which depend upon the piezo-electric effect of a quartz crystal or the change in resistance of a carbon pack, the present improved apparatus permits continuous measurements of pressure without frequent recalibration. The present invention also has a further advantage of simplicity and ruggedness of the equipment which must be mounted on the machine. This part of the equipment will withstand the vibration and abuse attendant to its use on high speed production machines, enabling measurements to be made under commercial machining conditions.

The present invention is of importance in the determination of the power required for machining a given workpiece.

Thus, as has been pointed out above herein, the pressure which is indicated on the pressure measuring meter (element 29 in the drawing), is the tangential component of the three components mentioned above. The torque which is exerted on the workpiece 9 is the product of the tangential component pressure and the radius of the workpiece. The power which must be made available at the workpiece is the product of the torque and the rotational speed of the workpiece. More simply, it can be calculated as the pressure of the chip 11 on the tool in pounds multiplied by the surface speed of the workpiece in feet per minute and divided by 33,000 to convert the answer into horsepower. To this must be added the power losses in the gearing of the machine in order to estimate the power required at the motor.

The present invention provides a simple apparatus, utilizing standard units, for determining power requirements for given machining operations.

We claim:

1. Apparatus for determining the machinability of metal, which comprises a cutting tool adapted to impart a predetermined cut to a rotating workpiece of the metal to be machined, means for mounting the cutting tool in cutting engagement with the material being machined, the said means being adapted to hold the said tool under a pressure required to impart a predetemined cut to the material, and to flex slightly under the said pressure, an adjustable condenser operatively connected to the tool mounting means for converting vibrations in the tool and holding means into a corresponding alternating potential, the said condenser being one element of a radio frequency oscillating circuit, means for measuring the variations in frequency of oscillation responsive to the said vibrations, the said circuit comprising a variable oscillator, a crystal controlled constant frequency oscillator electrically connected to the variation oscillator, whereby, upon impressing of the alternating potential upon the normal frequency of the circuit a beat frequency is generated, which beat frequency is equal to the differences in frequencies of the said oscillators and is substantially proportional to the applied pressure on the tool, said means for measuring the said beat frequency, including an electronic frequency meter adapted to deliver a pulsating direct current, and means for measuring the said pulsating direct current in terms of pressure between the cutting tool and the workpiece.

2. Apparatus for determining the machinability of metal, which comprises a cutting tool adapted to impart a predetermined cut to a rotating workpiece of the metal to be machined, a cantilever beam holder for the cutting tool for mounting the cutting tool in cutting engagement with the material being machined, the said cantilever beam being adapted to hold the said tool under an adjustable pressure required to impart the predetermined cut to the material, and to flex slightly under the said pressure, a condenser for converting vibrations in the tool and cantilever beam into an alternating potential, the condenser having two plates, one of which is mounted on the tool holder, the other being adjustable, the said condenser being one element of a radio frequency oscillating circuit which normally oscillates at a frequency tuned to the natural frequency of the tool and holder, the said circuit comprising a variable frequency oscillator, the variations in frequency being due to impressment of the said potential upon the normal frequency of the circuit, the said circuit also including a crystal controlled constant frequency oscillator electrically connected to the variable frequency oscillator, whereby a beat frequency is generated, which beat frequency is equal to the differences in frequencies of the said variable frequency oscillator and the constant frequency oscillator, an electronic frequency meter receiving the beat frequency and measuring the same, which beat frequency is substantially proportional to the appled pressure on the tool, and a voltmeter electrically connected to the frequency meter for indicating the direct current output from the said frequency meter, the said voltmeter being calibrated to read directly in pounds of tool pressure.

3. Apparatus for determining pressure between a machine tool and a workpiece being machined which comprises in combination, a cutting tool adapted to impart a predetermined cut to the workpiece, means for mounting the cutting tool in cutting engagement with the workpiece being machined, the said means being adapted to hold the said tool under a pressure required to impart the predetermined cut, the means forming a cantilever support for the tool which flexes slightly under the pressure applied to the tool, a condenser, one plate of which is in engagement with the holding means and is an element of a freely oscillating radio frequency circuit tuned to the natural frequency of the tool and holding means, the said condenser varying in capacitance responsive to vibrations set up in the tool and holder responsive to the pressure on the tool, thereby varying the frequency of oscillation of the said circuit, which circuit includes a variable frequency oscillator adapted to be tuned to the resultant frequency, a crystal controlled constant frequency oscillator remaining tuned to the former frequency of the circuit, thereby producing a beat frequency which is substantially proportional to the pressure on the tool, and means including an electronic frequency meter for measuring the beat frequency.

4. Apparatus for determining the machinability of metal by measuring tangential pressure between the metal and a cutting tool, which comprises a cutting tool disposed tangentially to the rotating workpiece and adapted to impart a predetermined cut to a rotating workpiece of the metal to be machined, means for mounting the cutting tool in tangential cutting engagement with the metal being machined, the said means including a cantilever beam rigidly held at one end, the remainder of the beam being free and adapted to flex slightly under pressure of substantially tangential engagement between the tool and workpiece during imparting of a predetermined cut to the workpiece, a two-plate condenser having spaced apart plates, one of the plates of the condenser being mounted on the said cantilever beam and moving therewith responsively to flexing of the beam and vibrations of the beam during machining of the workpiece in such manner that the capacitance of the condenser varies with the bending and vibrating of the said cantilever beam, the vibrations being mechanically amplified by the position of the condenser actuating portion of the said beam being at a greater distance from the point of support of the tool than is the actual cutting portions of the tool, a variable frequency oscillator connected to the condenser, the condenser being a part of the said oscillator, the said oscillator varying from its initial frequency in accordance with changes in capacitance of the condenser, a constant frequency crystal controlled oscillator, differences in frequencies between the two oscillators producing a beat frequency representing shifts in the variable oscillator as a result of the tangential pressure on the tool and the vibrations of the tool, an electronic frequency meter adapted to convert the said beat frequency into a pulsating unidirectional current, and a voltmeter connected to the frequency meter for measuring the pulsating unidirectional current in terms of tangential pressure between the cutting tool and the workpiece.

5. Apparatus for determining the machinability of metal, which comprises a tool holder beam immovably suspended at one end with another end unsupported to fully vibrate, a cutting tool held by the tool holder beam and adapted to engage a rotating workpiece of the metal to be machined and to impart a predetermined cut to the metal, the tool holder being adapted to bend under pressure of the engagement of the tool against the workpiece and to be vibrated by the engagement of the tool against the workpiece, an electrostatic condenser having one plate mounted on the tool holder adjacent to the unsupported end thereof and adapted to be actuated by the vibrations and bending of the said beam in such manner that the capacitance of the condenser varies with the bending of the holder beam, the vibrations produced incident to the machining of the workpiece by the tool being mechanically amplified by the position of the condenser actuating portion of the beam holder, which portion is at a greater distance from the point of support of the tool than is the actual cutting portion of the tool, a variable frequency oscillator including the condenser, the said oscillator varying from its initial frequency in accordance with changes in capacitance of the condenser, a constant frequency crystal controlled oscillator, the difference in frequencies producing a beat frequency representing the shift in the variable oscillator as a result of pressure on the tool and vibrations of the tool, an electronic frequency meter adapted to convert the said beat frequency into a pulsating unidirectional current, and means for measuring the pulsating unidirectional current in terms of pressure between the cutting tool and the workpiece.

6. Apparatus for determining the machinability of metal, which comprises a cutting tool adapted to impart a predetermined cut to a rotating workpiece of the metal to be machined, means for mounting the cutting tool in cutting engagement with the material being machined, the said means including a lever beam rigidly held at one end, the remainder of the beam being adapted to freely flex slightly under pressure, between the tool and workpiece during imparting of a predetermined cut to the workpiece, a two-plate condenser having spaced apart plates, one of the plates of the condenser being mounted on the said lever beam and moving therewith, a variable oscillator including the condenser, a crystal controlled constant frequency oscillator electrically connected to the variable oscillator, the said condenser having its capacitance varied by flexing of the said lever beam and vibrations produced therein responsively to machining of the workpiece by the tool, changes in capacitance of the condenser producing a beat frequency caused by differences in frequencies between the variable oscillator and the crystal controlled constant frequency oscillator, and means for measuring the said beat frequency, the said means including an electronic frequency meter adapted to deliver a pulsating unidirectional current, and means for measuring the said pulsating unidirectional current in terms of pressure between the cutting tool and workpiece.

7. Apparatus for determining the machinability by measuring tangential tool pressures between a rotating metal workpiece being machined and a cutting tool mounted tangentially against the workpiece, which comprises a tool post, a cantilever tool holder in the tool post, a cutting tool mounted in the tool holder, the tool being mounted tangentially to the workpiece in cutting engagement therewith, the center line of the workpiece being machined, the cutting point of the cutting tool, and the center line of support of the tool holder in the tool post being all on a common center line, a two-piece condenser forming an element of a radio frequency circuit, one plate of the condenser being mounted on the cantilever tool holder and movable therewith, a radio frequency type variable oscillator connected in circuit with the condenser, an invariable crystal controlled oscillator in circuit with the variable oscillator, whereby differences in frequencies between the two oscillators set up by changes in capacitance of the condenser responsively to flexings of the cantilever tool holder under varying tangential pressures of the tool on the workpiece produce a beat frequency, an electronic frequency meter in circuit with the invariable crystal oscillator for receiving the beat frequency as input, and having for its output a pulsating unidirectional current, proportional to the pressure between the tool and workpiece, and means for measuring the pulsating direct current in terms of tool pressure.

MORRIS ASIMOW.
WALTER F. CRAIG, JR.
PAUL GRAVENSTRETTER.